United States Patent
Pang

(10) Patent No.: US 8,238,535 B2
(45) Date of Patent: Aug. 7, 2012

(54) AUTOMATICALLY GENERATED INCOMING CALL DISTRIBUTION

(75) Inventor: Kong-How Pang, Litchfield, CT (US)

(73) Assignee: Neopost Technologies, Bagneux (FR)

( * ) Notice: Subject to any disclaimer, the term of this patent is extended or adjusted under 35 U.S.C. 154(b) by 1220 days.

(21) Appl. No.: 11/847,182

(22) Filed: Aug. 29, 2007

(65) Prior Publication Data

US 2008/0056479 A1    Mar. 6, 2008

Related U.S. Application Data

(60) Provisional application No. 60/840,713, filed on Aug. 29, 2006.

(51) Int. Cl.
*H04M 3/42* (2006.01)
(52) U.S. Cl. ....... 379/201.05; 705/60; 705/61; 705/401; 705/409; 370/230; 370/468
(58) Field of Classification Search ............. 379/201.05, 379/266.07; 370/468, 230, 230.1; 705/401, 705/60, 51, 61, 409
See application file for complete search history.

(56) References Cited

U.S. PATENT DOCUMENTS

| 6,061,442 | A | 5/2000 | Bhat |
| 6,771,661 | B1 * | 8/2004 | Chawla et al. ............... 370/468 |
| 2004/0117313 | A1 * | 6/2004 | Mattern et al. ............... 705/60 |
| 2005/0209927 | A1 * | 9/2005 | Aaltonen et al. ............. 705/26 |

FOREIGN PATENT DOCUMENTS

| EP | 1 198 084 | 4/2002 |
| WO | WO 01/01232 | 1/2001 |

OTHER PUBLICATIONS

International Preliminary Report corresponding to the PCT/US2007/077129 application dated Mar. 3, 2009.
Supplementary European Search Report corresponding to the EP07841563 application dated Sep. 30, 2010.

\* cited by examiner

*Primary Examiner* — Antim Shah
(74) *Attorney, Agent, or Firm* — Morris & Kamlay LLP

(57) ABSTRACT

Systems and methods are provided in which remote installed devices may be assigned various call-in times to contact a host controller. The host may schedule remote devices sequentially across multiple modems. Additional modems may be added to the system as more bandwidth is desired or required. The system may include additional, unscheduled bandwidth to account for calls made by devices outside of the assigned call times.

12 Claims, 3 Drawing Sheets

AUTOMATICALLY GENERATED INCOMING CALL DISTRIBUTION

RELATED APPLICATIONS

This application claims priority to and is a non-provisional of U.S. Provisional Patent Application No. 60/840,713, filed Aug. 29, 2006, the disclosure of which is incorporated by reference in its entirety.

BACKGROUND

In many business systems, remote devices may need to connect to a host device to register with a host system, receive configuration data, receive updates, provide tracking information, or perform various other operations. When multiple installed base devices are configured to contact a host server to effectuate business transactions, the number of base devices, connection time, and amount of data to be transferred may exceed the bandwidth available to the host server. Typically, if the installed base devices are not controlled as to when they are allowed to contact the host server, multiple base devices attempt to make contact with the host at the same time. Thus, the available bandwidth will be exceeded, causing busy signals or other indications that no additional bandwidth is available to be returned to the calling devices.

As a specific example, remotely-installed postage meters may need to make regular and/or routine calls to a host server, such as to provide payment information, receive updated rate information, and perform other operations. Typically, installed base devices are commanded to call into a host data center at prescribed intervals to upload required operational history and collected data. Such operational history or data may relate to postal information that must be tracked on a daily basis in order to comply with regulatory constraints. Other history or data may relate to daily reporting of usage parameters, said parameters may be used in calculating charges or billing for devices usage or throughput over a known period of time (i.e., volume discounts). These calls typically are made over conventional phone lines, requiring the host system to maintain multiple modems and phone lines. If an insufficient number of modems are included, or if too many base devices attempt to call in to the host system within the same time period, the devices may be unable to connect to the host system.

In conventional systems, devices often are programmed to call in to report at a specific time, typically outside of working hours, so as not to overburden the host system with data reporting when normal business is being conducted. However, if devices are commanded to call in at "off business" hours, many devices will call at the beginning of the "off business" hours. Establishing a calling priority for installed base devices at the time of installation at a customer site may not be possible due to the size of the installed base and the dynamics of said base related to new installations, cancellations, device upgrades, etc.

SUMMARY

Systems and methods according to the present invention may allow for distribution of incoming calls over a given time period. The calls may be distributed within a host system and/or across multiple communication ports, to improve the communications bandwidth available from a limited number of modems.

DETAILED DESCRIPTION

In systems and methods according to the present invention, each device in the system may be assigned one or more call-in date and time based upon when its history or collected data is required for upload. This may reduce the probability that two device call-ins can automatically occur at the same time, resulting in a more balanced communication load on the host system than in conventional systems.

Figure 1:
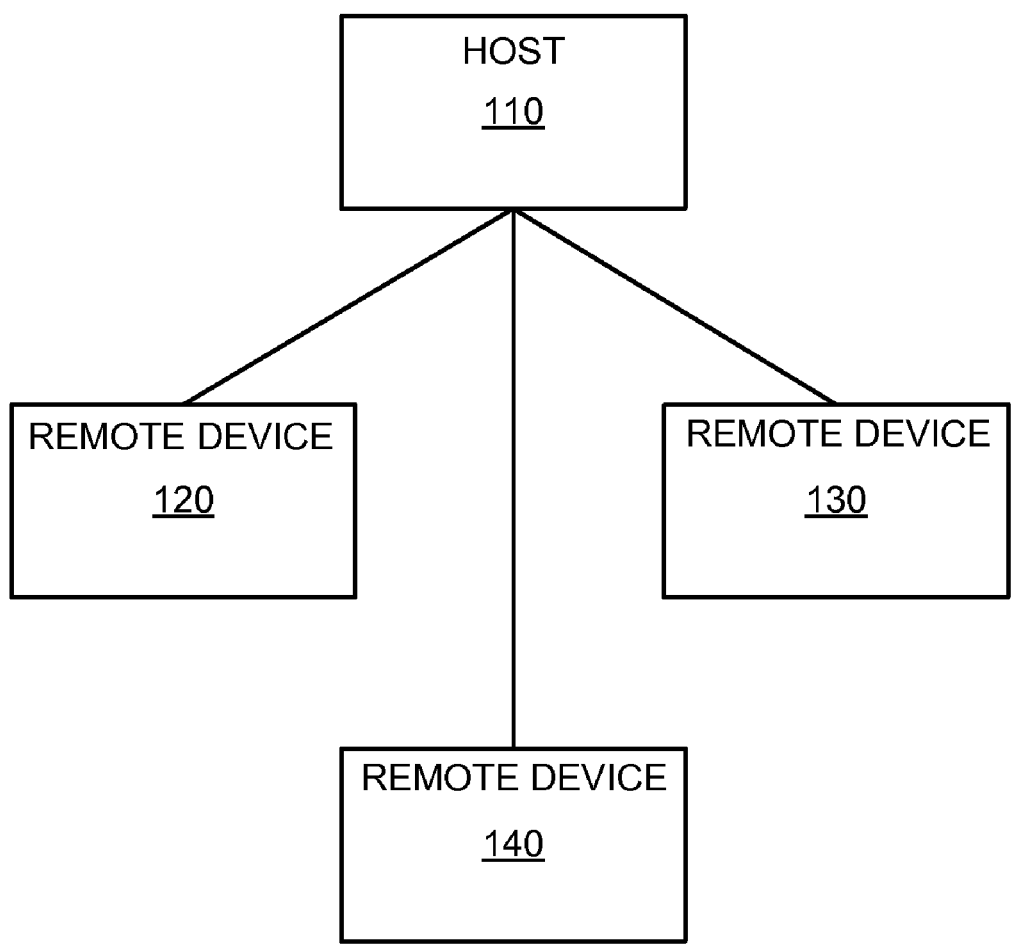
FIG. 1 shows an exemplary system having a host controller and remote devices according to the present invention.

FIG. 1 shows an exemplary system including a host system 110 and remote devices 120, 130, 140 according to the present invention. Upon device installation at a customer site, a device 120 may establish communication with the remote host service support to request configuration tables or data structure to establish automatic call scheduling and associated commands for the device. The calls may be scheduled based on one or more of the following parameters:

Type of operation (e.g. USPS rate file download, software download, statistics upload, delivery confirmation records upload etc.).

Figure 2:
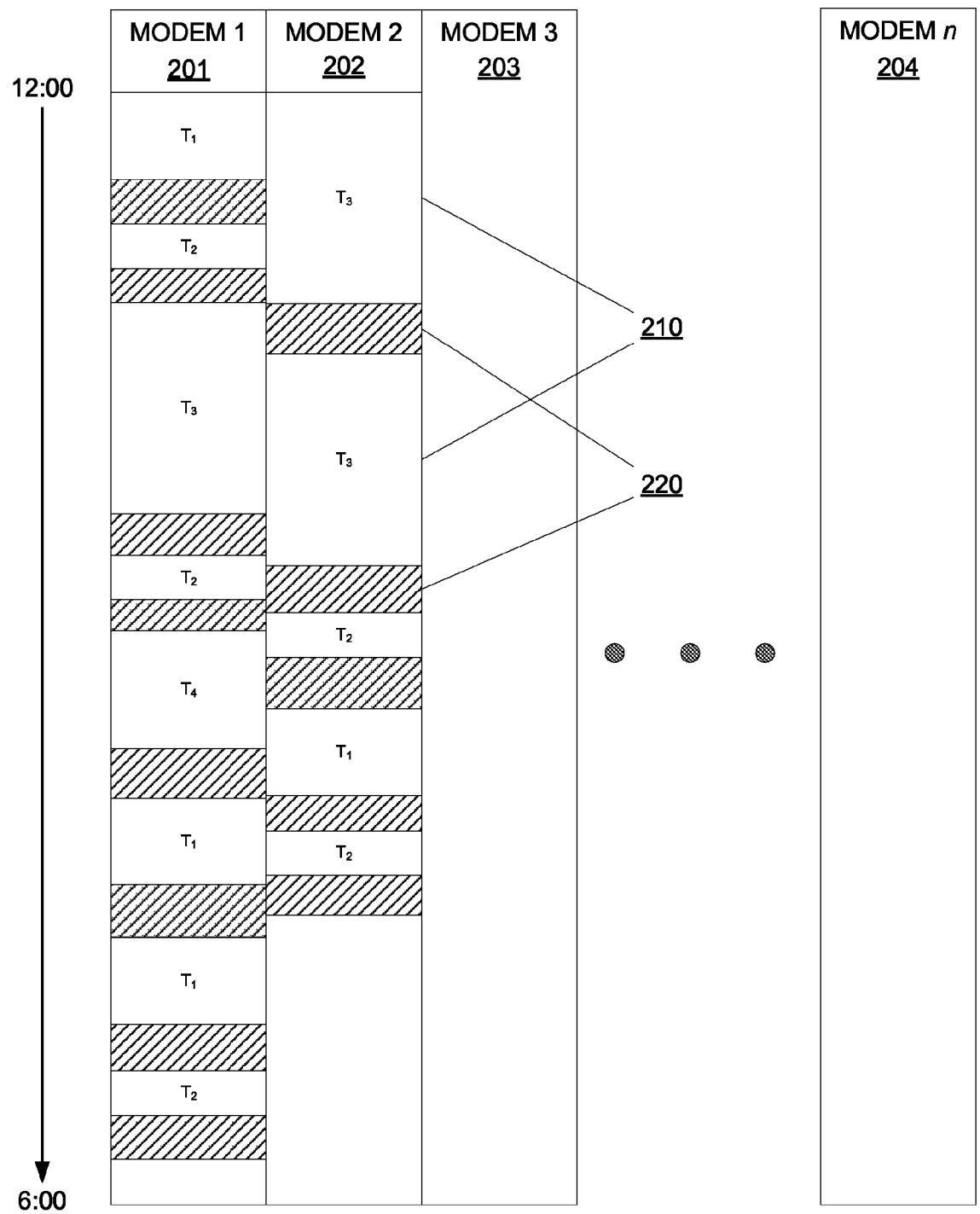
FIG. 2 shows a schematic assignment of call times to various modems in a host system according to the present invention.

Expected duration for each type of operation ($T_1$, $T_2$, etc. as shown in FIG. 2).

Time Period during which calls can be scheduled (e.g. midnight to 6 am).

Automatic control scheduling notification also may be implemented for other applications such as aircraft maintenance scheduling, the number of hangars, or number of loading station for a distribution center, air traffic control for managing air plane arrival, and other similar functions. In general, the systems and methods disclosed herein may be used in any system in which installed base devices are commanded to call into a host data center at certain prescribed intervals and/or times in order to upload required operational history and collected data and/or receive data from the host data center.

In a system according to the present invention, a first call-in for a new remote device may be prevented from overlapping another preset call-in for an existing device by assigning the next available call slot for the type of operation and duration. Various device operations may require a variability in the time allocated to the operation, so it may be useful for the associated time duration associated with an operation to have a tolerance band supporting statistically shorter or longer actual communication durations. As the call-in structure grows, such as when more devices are calling in to the host system, eventually exceeding the bandwidth capacity (modem capacity) of the host system, the host system may be expanded by adding bandwidth (e.g. more network capacity or modems), as illustrated in FIG. 2.

Each scheduled call-in operation may be stored and tracked by device identifiers. That is, each device in the system may have a unique identifier communicated to its associated host. If a device that is scheduled to call into its associated host fails to call in at a scheduled call time, the device may automatically schedule a retry after a specified time. The device may make multiple retry calls, such as when the first is unsuccessful. Calls may be scheduled at regular times, or at specific times each day, or any other schedule. To allow for retry scenarios to be successful, a number of modems or sufficient bandwidth may be "set aside," i.e. generally kept out of use, for retry calls. The set-aside modems and/or bandwidth may be omitted from use in the normal automatic call scheduling calculation. Retry calls may be required due to an interruption in device operation such as when a remote device loses power or is otherwise removed from service. Retry calls also may be required after a host failure, or if a device initially calls in to a non-responsive host.

In a retry scenario, once a retry call is successfully accepted by the "set aside" bandwidth or modem(s), a "set aside" support system may assign a next call slot for the type of operation and duration required for the retried call; this may prevent a new call entry from overlapping another preset call-in for an existing device. Thus the retrying device may be inserted or re-inserted into the call distribution system database management system.

To manage the modem/communication pool, a hunt group may be used so that the modems/phone lines of the host system are used on a first-come-first serve basis. Thus, a device need not always connect to the same modem or phone connection.

As the number of installed base devices expand, modems may be added to maintain a uniform distribution of the new bandwidth across the modems. This addition may be transparent to the installed base devices since base devices do not preferentially connect to any particular modem or communication port in the host system.

The invention may decrease the host support system requirements such that bandwidth capacities may always be estimated over an equal distribution of device call-ins within a defined window of opportunity. It may also reduce any peak load capacity restrictions due to multiple devices simultaneously attempting to call into the host data center to upload history or collected data, and allow customer devices to automatically call into a host data center and upload required data at a date and time transparent to the customer, but as required by the server.

FIG. 2 illustrates the assignment of call times to various modems in a host system according to the present invention. A host system may include multiple modems 1, 2, 3 . . . n 201-204. As the host system becomes aware of installed remote base devices and the operations each device will need to perform, it may assign call times to the devices. The host may store a record of operations to be performed by each device, or the device may indicate operations to be performed during an initial call to the host. As a specific, non-limiting example FIG. 2 shows a system where each remote device can perform one or more of four operations, where each operation has an expected call time of $T_1$, $T_2$, $T_3$, or $T_4$. As previously described, a variety of factors may be considered by the host system in determining the expected length of a call associated with a specific operation; the times shown in FIG. 2 are exemplary. As devices call in to the host system, the host system may assign various call time slots 210 to the devices and instruct each device to call the host system at the assigned time(s). For example, the host system may schedule calls between 12:00 am and 6:00 am. When a first device contacts the host system, it may be recognized by the host system as requiring operations $T_1$ and $T_2$. Call times corresponding to the expected durations of those operations may be scheduled for the first-available modem. In the example illustrated in FIG. 2, the operations are scheduled for the first call times for modem 1 201. As additional devices call the host system, call times corresponding to the operations required for each device are scheduled at the host system.

The operations and call times may be scheduled sequentially per modem. That is, the available time for modem 1 may be scheduled, until the modem has a "full" schedule as illustrated in FIG. 2, at which point operations and call times are scheduled for the next modem 202, and so on. An amount of "padding" time 220 may be scheduled before and/or after a call time. The padding time may be a standard amount of time, or it may vary depending on, for example, the expected length of the call preceding it in the schedule. A padding time may be used to account for situations where an operation takes longer than the scheduled call time, without adversely affecting later-scheduled call times on the same modem.

The call-scheduling procedure may continue as additional devices call in to the host system. When the available modems have little or no open time available for scheduling, additional modems may be added to the host. For example, after the available call time for modems 1 and 2 is filled, or at a point before all the available time is filled, an additional modem 203 may be added to the host. Additional modems 204 may be added as required to increase the total bandwidth available at the host.

In some configurations, some bandwidth may be set aside for unscheduled calls. For example, a modem 203 may be partially or entirely unscheduled. When an unscheduled call is received, the call may be handled by the unscheduled modem. The amount of bandwidth (i.e., number of modems and/or amount of time) set aside for unscheduled calls may vary depending on the needs of the system. For example, a host system may maintain more set aside bandwidth as more remote devices are added to the system. Other factors may be used to calculate the amount of set aside bandwidth.

Figure 3:
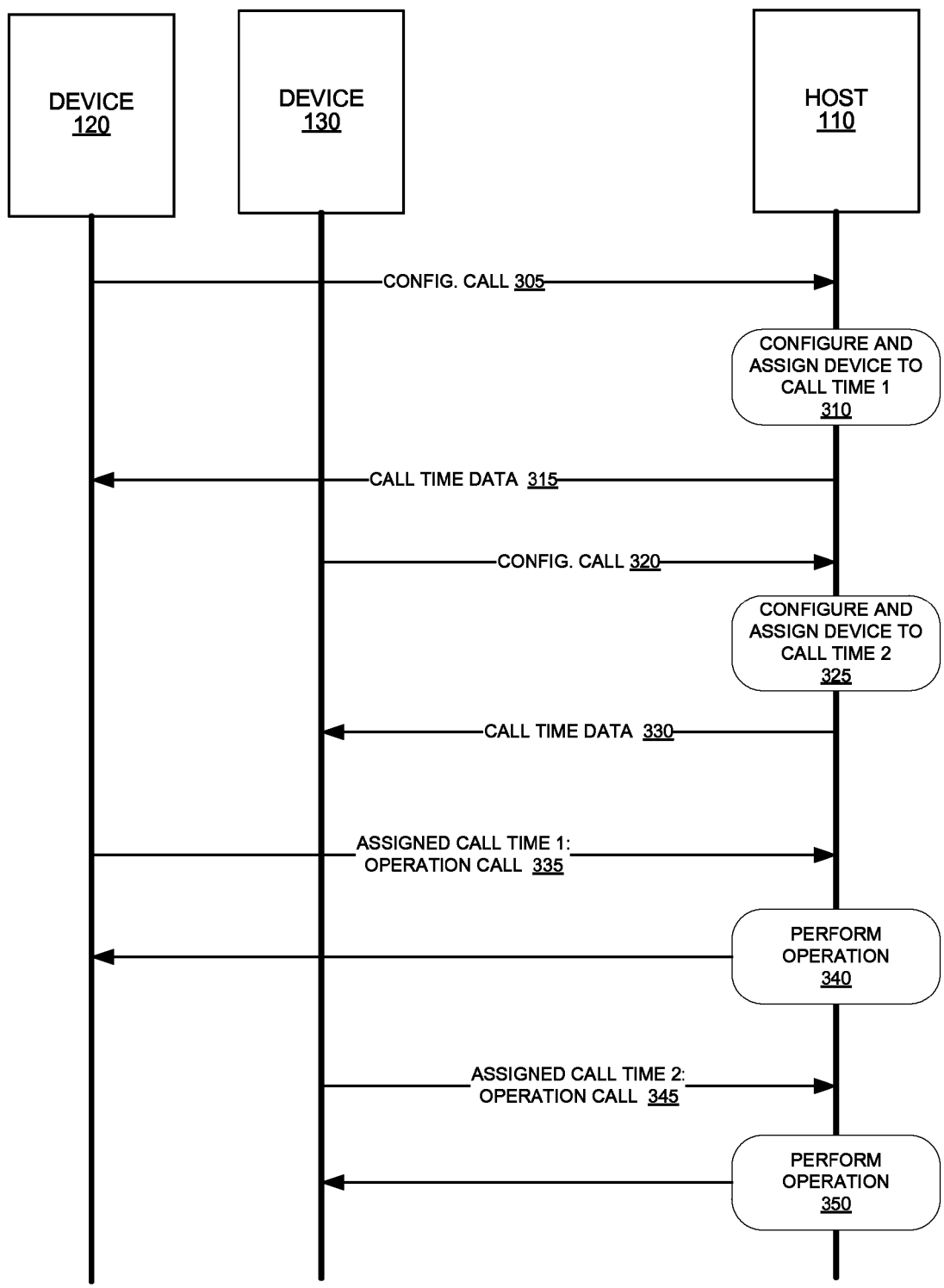
FIG. 3 shows exemplary communications between remote devices and a host system according to the present invention.

FIG. 3 shows exemplary communications between remote devices and a host system according to the present invention. Two remote devices 120, 130 are shown for illustration purposes, though the methods and systems described herein may be extended to an arbitrary number of remote devices. Each remote device 120, 130 may make an initial configuration call 305, 320 to the host 110.

During the initial call, the host may configure the device, identify operations the device will need to perform, and/or provide one or more assigned call times to the device 310, 325. The initial configuration may include additional operations, such as enabling functionality of the device, registering the device as an authorized device, and recording information about the location at which the device is installed. The host controller 110 may store a record of the features and operations that should be enabled for each device, and use the record to configure the device during an initial call. For example, an owner of the remote device may have a contract with the host owner, specifying certain features that the remote device can perform. The host may store a record of the features and operations to be performed by the device as defined by the contract. Thus, when an initial call is made, the host may configure the remote device according to the contractual terms associated with the device. In addition to performing initial configuration, the host may assign one or more call times to the remote devices 315, 330.

After the call times have been assigned to the remote devices, each device may call the host at the assigned call time 335, 345. The host and/or device may then perform the operation 340, 350 associated with the assigned call time 335, 345, respectively. The operation may include receiving information from the remote devices, such as ascending and descending register data, sales data, maintenance records, and/or other information. The operation also may include sending information to the remote device, such as rate data updates, postal code updates, and other data.

It will be understood that, although FIG. 3 illustrates the configuration calls 305, 320 and subsequent communication and operation being performed in a particular sequence, the device calls and operations need not occur in the order shown.

For example, two devices may call the host at the same time or perform calls at overlapping times, and/or the devices may call the host in a different order from that illustrated. As another example, the devices may be assigned to call times that occur in an order different from that illustrated in FIG. 3.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method of distributing automated incoming calls in a postal metering system, comprising:
    responsive to receiving a first incoming call from a remote postal device, determining an available call time based upon:
        a type of operation to be performed by the remote postal device;
        an expected duration of the operation; and
        a time period available for scheduling a subsequent call;
    determining the type of operation to be performed during the subsequent call;
    calculating the expected length of the subsequent call based on previous calls during which the same type of operation was performed;
    assigning the remote postal device to the available call time, the available call time being within the available time period and at least as long as the expected length of the subsequent call;
    storing a record of the remote device and the assigned available call time; and
    commanding the device to make the subsequent call during the assigned available call time.

2. The method of claim 1, comprising:
    reserving a modem, an amount of bandwidth, or both;
    responsive to receiving a second incoming call from the remote device, if the second incoming call is received during a time period that does not correspond to an assigned call slot for the remote device, using the reserved modem, amount of bandwidth, or both to receive and process the second incoming call.

3. The method of claim 1, comprising:
    determining multiple operations to be performed by the remote device; and for each operation:
        assigning the device to an available call time within an available time period;
        storing a record of the remote device and the assigned call time; and
        commanding the device to make a subsequent call during the assigned call time.

4. The method of claim 3 wherein the operations to be performed by the remote device are defined by a contract associated with an owner of the remote device.

5. The method of claim 3 wherein each of the operations to be performed by the remote device is of a different type than the other operations.

6. The method of claim 3, wherein a first operation of the multiple operations is:
    receiving ascending register data, descending register data, or both from the remote device;
    receiving maintenance records from the remote device; or
    receiving sales data from the remote device; and
    wherein a second operation of the multiple operations is:
        providing rate data updates to the remote device; or
        providing postal code updates to the remote device.

7. The method of claim 1, comprising:
    during the first call, enabling features of the remote device for use by the remote device.

8. The method of claim 1, wherein the type of operation to be performed during the subsequent call is defined by a contract associated with an owner of the remote device.

9. The method of claim 1, wherein the host provides postal rate information to the remote device during the subsequent call.

10. The method of claim 1, wherein the type of operation is one of:
    receiving ascending register data, descending register data, or both from the remote device;
    receiving maintenance records from the remote device;
    receiving sales data from the remote device;
    providing rate data updates to the remote device; or
    providing postal code updates to the remote device.

11. A host controller for use in a postal metering system, the host controller arranged and configured to:
    responsive to receiving a first incoming call from a remote postal device, determine a type of operation to be performed by the remote postal device during a subsequent call;
    calculate the expected length of the subsequent call based on pervious calls during which the same type of operation was performed;
    determine an available call time based upon the type of operation to be performed, the available call time being within an available time period and at least as long as the expected length of the subsequent call;
    store a record of the remote device and the available call time; and
    command the device to make the subsequent call during the assigned call time.

12. The method of claim 11, wherein the type of operation is one of:
    receiving ascending register data, descending register data, or both from the remote device;
    receiving maintenance records from the remote device;
    receiving sales data from the remote device;
    providing rate data updates to the remote device; or
    providing postal code updates to the remote device.

* * * * *